Figures 1, 2:
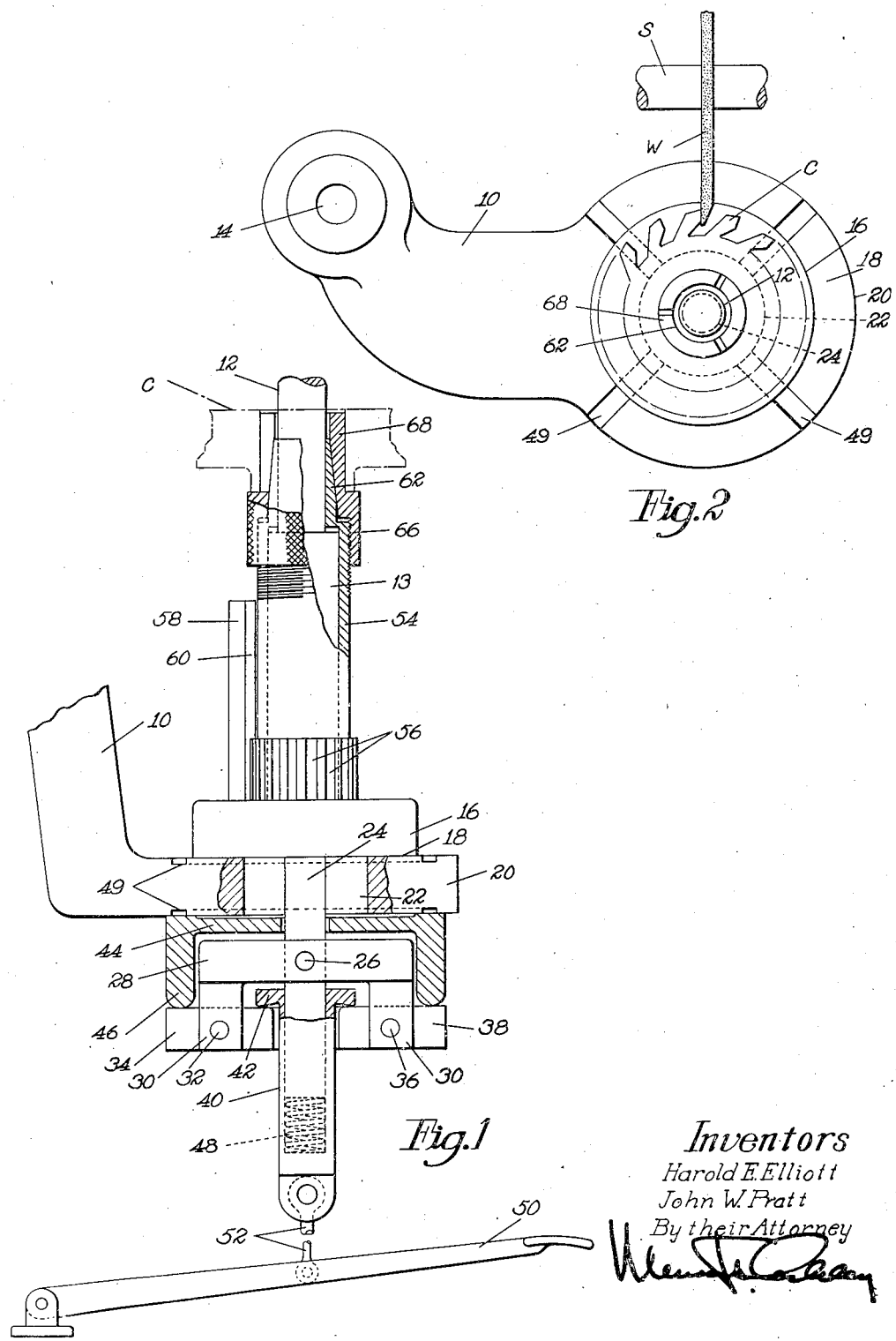

July 26, 1949.  H. E. ELLIOTT ET AL  2,477,052
ADJUSTABLE WORK SUPPORT
Filed Feb. 28, 1948

Inventors
Harold E. Elliott
John W. Pratt
By their Attorney

Patented July 26, 1949

2,477,052

UNITED STATES PATENT OFFICE 2,477,052

ADJUSTABLE WORK SUPPORT

Harold Ernest Elliott and John William Pratt, Leicester, England, assignors to United Shoe Machinery Corporation, Flemington, N. J., a corporation of New Jersey Application February 28, 1948, Serial No. 12,054
In Great Britain April 23, 1947

4 Claims. (Cl. 51—225)

This invention relates to adjustable work supports and it is herein disclosed as embodied in a device for supporting a rotary toothed cutter in a desired position of adjustment for presentation to a grinding wheel. For an example of a work support of this general character, reference may be had to United States Letters Patent No. 2,210,005, granted August 6, 1940, upon the application of Eugene J. Ray. This patent shows a work support having an upright post upon which the toothed cutter is mounted, the post being carried by an arm with provision for adjustment longitudinally of the arm. When the post has been adjusted along the arm, the cutter is ground by mounting it on the upper portion of the post and then moving it down to bring one of the teeth into engagement with the grinding wheel. After that tooth has been ground, the cutter is raised out of contact with the grinding wheel and rotated to bring the next tooth into operative position; and the operation is repeated until all the teeth have been ground. The precise angle at which the teeth are thus ground depends upon the position of the post relative to the grinding wheel, and the adjustment of the position of the post is therefore important.

It is an object of the present invention to provide a work support of the type above referred to having provision for free and ready adjustment of a work holder and also to provide a work support in which the work holder can conveniently be held in adjusted position during an operation or series of operations. In accordance with this object, the illustrated work support has an arm upon which the work holder is slidable to enable the work holder to be adjusted to a desired position, and has also a treadle operated mechanism whereby the work holder can be held clamped in its adjusted position. As shown herein, the arm is in the form of a plate having a flat bearing surface upon which the base of the work holder is slidable to enable the work holder to be adjusted to a desired position in all directions in the plane of the flat bearing surface, and the clamping mechanism operates to hold the base of the work holder against the plate.

The invention further consists of various features of construction and combinations and arrangements of parts herein shown and claimed, the advantages of which will be apparent to those skilled in the art from the following description, reference being had to the accompanying drawings, in which Fig. 1 is a front elevation, partly in section, of an illustrative work support embodying present invention; and Fig. 2 is a plan view of the work support shown in Fig. 1.

Referring to the drawings, the illustrated work support comprises an arm or bracket 10 upon which is mounted a work holder in the form of a post 12 having a lower portion 13 of greater diameter than its upper portion. A toothed cutter C such as the ordinary trimming cutter for operating upon the edges of shoe soles is mounted indirectly upon the post 12 for presentation to a grinding wheel W which is carried upon a shaft S rotatable in fixed bearings. The arm 10 has a hole 14 for engagement with an upright pivot pin (not shown) about which the arm can be angularly adjusted. The purpose of this pivotal mounting of the arm 10 is to provide for a rough adjustment relative to the grinding wheel W. The arm 10 is clamped in this position of adjustment and is thus held stationary during the grinding operation.

The post 12 has a flat circular disk-like base 16 having a smooth under surface which rests upon a smooth, flat, horizontal surface 18 of the arm 10 adjacent to the unsupported end thereof. The base 16 is thus slidable in all directions upon the surface 18. The portion of the arm 10 adjacent to its unsupported end is in the form of a flat plate 20 and in it is formed a circular opening 22 which is of smaller diameter than the base 16 and which is bridged by the base. Extending down from the base 16 and coaxial therewith is a stem 24 of considerably less diameter than that of the opening 22 to provide freedom of horizontal adjustment of the base 16 and post 12. Secured by a pin 26 upon the stem 24 below the plate 20 is a disk 28 having a pair of diametrically opposite downwardly extending lugs 30. Pivotally mounted upon one of the lugs 30 by a pin 32 is a lever 34 having both ends free. Similarly mounted upon the other lug 30 by a pivot pin 36 is a lever 38 having both ends free, the axes of the pins 32 and 36 being horizontal and parallel to each other. Slidably mounted over the lower end portion of the stem 24 is a sleeve 40 having at its upper end a disk-like flange or annular shoulder 42 which overlies the inner ends of both levers 34 and 38. Interposed between the disk 28 and the plate 20 is a disk 44 having a central opening which loosely fits the stem 24. This disk has at its periphery a depending annular flange 46, the disk and flange thus forming an inverted cup-shaped structure, the rim of the flange 46 being engaged simultaneously by the outer ends of the levers 34 and 38. Housed within the central bore of the sleeve 40 and interposed between the closed end of the bore and the lower end of the stem 24 is a coil compression spring 48 which exerts a light downward pressure upon the sleeve to cause the levers 34 and 38 to bear upwardly against the flange 42 and hold the disk 44 in light clamping engagement with the under side of the plate 20, while, at the same time, the downward pull of the sleeve 40 exerted through the pins 32 and 36 and the pin 26 will hold the under surface of the disk 44 in light clamping engagement with the surface 18. The position of the post 12 can now be readily adjusted on the plate 20 by sliding the base 16 in any desired direction. Formed in the upper and lower bearing surfaces of the plate 20 are slots 49 for receiving dust resulting from the grinding operation. Such dust might otherwise hinder the free sliding of the base 16 and the disk 44 on said bearing surfaces.

To hold the base 16 in its adjusted position a heavy clamping pressure is applied by mechanism comprising a treadle 50 connected by a rod 52 to the lower end of the sleeve 40. During the application of such relatively heavy clamping pressure an operation or a series of operations may be performed upon the cutter C without danger of accidental change of the position of the post 12.

While the device above described may be adapted to support a toothed cutter directly by mounting the cutter upon a post like the post 12 but of suitable diameter to fit the central bore of the cutter, the arrangement now to be described for mounting it may be in some cases more satisfactory. Slidably engaging the post 12 is a sleeve 54 having a portion of enlarged external diameter adjacent to its lower end in which is formed a plurality of notches 56 equal in number to the teeth of the cutter C. Secured in the base 16 is an upright post 58 having a spline 60 which is engageable in turn with each of the notches 56. The sleeve 54 has an externally tapered or frusto-conical upper portion 62 which fits the upper portion of the post 12. Below the portion 62 on the sleeve 54 are formed external screw threads for engaging a knurled collar 66. This collar has an upwardly extending portion in the form of a spring bushing 68 which is tapered internally complementally to the tapered portion 62 and which is slotted to enable it to expand when urged downwardly by turning the collar on the threaded portion of the sleeve 54. The cutter C is mounted on the spring bushing 68 of the collar 66 and is thus gripped firmly by the collar when the knurled portion of the collar is turned.

In using the illustrated device, the operator removes the sleeve 54, with the collar 66 attached thereto, from the post 12. He then mounts the cutter C over the spring bushing 68 and turns the knurled collar 66 to clamp the cutter on the spring bushing; then he slides the sleeve 54 down over the post 12, with one of the notches 56 engaging the spline 60 and with the lower end of the sleeve resting on the base 16. With the cutter thus mounted indirectly upon the post 12, the operator moves the base 16 upon the plate 20 until he has brought one tooth of the cutter into desired relation to the grinding wheel W, as shown in Fig. 2. He then bears down on the treadle 50 and holds it down to maintain the base 16 in its adjusted position during the remainder of the operation. After having ground the first tooth, he raises the sleeve 54 high enough on the post 12 to disengage it from the spline 60, turns it far enough to bring the next notch 56 into register with the spline, and then lowers it into operating position to cause the next tooth of the cutter to be ground; and he continues in this manner until all the teeth have been ground. It is evident that after the base 16 has been clamped in its adjusted position by the treadle 50 for the grinding of the first tooth, each succeeding tooth will be presented to the grinding wheel in exactly the same relation as was the first tooth. No adjustment of the base 16 need be made for any tooth except the first to be ground, and all the teeth will be ground uniformly.

Having described our invention, what we claim as new and desire to secure by Letters Patent of the United States is:

1. A work support comprising a work holder, a bracket having a flat bearing surface upon which said work holder is slidable in all directions to enable the work holder to be adjusted to a desired position, mechanism for clamping said work holder to the bracket in said position of adjustment, and a treadle for operating said clamping mechanism.

2. A work support comprising a work holder, a bracket having a flat bearing surface upon which said work holder is slidable to enable the work holder to be adjusted to a desired position, mechanism for clamping said work holder to the bracket, a spring operating upon said clamping mechanism to hold the work holder against the bracket with a light pressure to facilitate adjustment, and a treadle through which the clamping mechanism can be caused to hold the work holder against the bracket with a heavy pressure to maintain the work holder in adjusted position.

3. A work support comprising a work holder having a base, a plate having a flat bearing surface upon which the base of said work holder is slidable to enable the work holder to be adjusted to a desired position, said plate having an opening surrounded by said bearing surface, a clamp engageable with the under surface of said plate, and treadle operated mechanism including a member extending from said work holder down through said opening for urging the base of the work holder and the clamp toward each other to cause them to exert clamping pressure upon the plate for the purpose of securing the work holder in adjusted position.

4. A work support comprising a work holder having a base, a plate having a flat bearing surface upon which the base of said work holder is slidable in all directions to enable the work holder to be adjusted to a desired position, said plate having an opening surrounded by said bearing surface, a stem extending from said base down through said opening, a clamp engageable with the under surface of the plate and slidable on the stem, a pair of levers, means carried by said stem for pivotally supporting the levers on opposite sides of the stem below the clamp, a sleeve slidable on said stem below the clamp and having a shoulder engageable with both levers to cause both levers to exert an upward pressure upon the clamp when the sleeve is moved down, and treadle connections through which the sleeve can be urged down to cause the clamp to press upwardly against the under surface of the plate, said treadle connections operating also through the pivotal supporting means for the levers to cause the base of the work support to press downwardly against the bearing surface of the plate.

HAROLD ERNEST ELLIOTT.
JOHN WILLIAM PRATT.

REFERENCES CITED

The following references are of record in the file of this patent:

UNITED STATES PATENTS

| Number | Name | Date |
|---|---|---|
| 905,461 | Robinson | Dec. 1, 1908 |
| 1,091,074 | Moore | Mar. 24, 1914 |
| 1,992,147 | Gordon | Feb. 19, 1935 |